(12) United States Patent
Takano et al.

(10) Patent No.: US 8,820,256 B2
(45) Date of Patent: Sep. 2, 2014

(54) FRICTIONAL RESISTANCE REDUCING DEVICE OF SHIP

(75) Inventors: Shinichi Takano, Tokyo (JP); Shuji Mizokami, Tokyo (JP); Seijiro Higasa, Tokyo (JP); Chiharu Kawakita, Tokyo (JP); Kiyomitsu Mukou, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 155 days.

(21) Appl. No.: 13/376,221

(22) PCT Filed: Sep. 30, 2010

(86) PCT No.: PCT/JP2010/067064
§ 371 (c)(1),
(2), (4) Date: Dec. 5, 2011

(87) PCT Pub. No.: WO2011/052337
PCT Pub. Date: May 5, 2011

(65) Prior Publication Data
US 2012/0097089 A1    Apr. 26, 2012

(30) Foreign Application Priority Data
Oct. 26, 2009   (JP) ................................ 2009-245515

(51) Int. Cl.
*B63B 1/38*    (2006.01)
(52) U.S. Cl.
CPC . *B63B 1/38* (2013.01); *Y02T 70/122* (2013.01)
USPC ...................................................... 114/67 A
(58) Field of Classification Search
CPC .. B63B 1/38; B63B 2001/387; Y02T 70/122; Y02T 70/121
USPC ................................................ 114/67 A, 67 R
See application file for complete search history.

(56) References Cited

U.S. PATENT DOCUMENTS

| 780,122 | A | * | 1/1905 | Nelson ......................... 114/67 A |
| 6,789,491 | B2 | * | 9/2004 | Takahashi et al. .......... 114/67 A |
| 2011/0094435 | A1 | | 4/2011 | Takano et al. |

FOREIGN PATENT DOCUMENTS

| CN | 1209405 | 3/1999 |
| CN | 102112366 | 6/2011 |

(Continued)

OTHER PUBLICATIONS

Japanese Decision to Grant a Patent mailed Jun. 13, 2013 in corresponding Japanese Patent Application No. 2009-245515 with English translation.

(Continued)

*Primary Examiner* — Stephen Avila
*Assistant Examiner* — Andrew Polay
(74) *Attorney, Agent, or Firm* — Wenderoth, Lind & Ponack, L.L.P.

(57) ABSTRACT

A gas room is arranged in a hull to cross a longitudinal frame and extend in a width direction. A scattering member is arranged in the gas room to cross the longitudinal frame and extend in the width direction. Air blown into the gas room from an air supply pipe hits the scattering member to scatter in the width direction, and is blown from an air blowing hole formed in a bottom of the gas room into water. Because the gas room crosses the longitudinal frame and extends in the width direction, an air bubble flow with a wide width forms in the width direction by the single gas room. Therefore, the number of gas rooms for air bubble flow which covers the whole width of a ship bottom is reduced, and the number of air supply pipes which are provided to every gas room is reduced.

6 Claims, 15 Drawing Sheets

(56) References Cited

FOREIGN PATENT DOCUMENTS

| | | |
|---|---|---|
| EP | 0 903 287 | 3/1999 |
| GB | 1190621 | 5/1970 |
| JP | 48-35557 | 10/1973 |
| JP | 60-139586 | 7/1985 |
| JP | 09-207873 | 8/1997 |
| JP | 10-24891 | 1/1998 |
| JP | 11-227675 | 8/1999 |
| JP | 11-291973 | 10/1999 |
| JP | 11-301570 | 11/1999 |
| JP | 2008-143345 | 6/2008 |
| WO | 84/04903 | 12/1984 |

OTHER PUBLICATIONS

International Search Report issued Dec. 21, 2010 in International (PCT) Application No. PCT/JP2010/067064.
Supplementary European Search Report issued Mar. 15, 2013 in corresponding European Patent Application No. 10826471.4.
Chinese Notice of the Opinion on Examination issued Dec. 4, 2013 in corresponding Chinese Patent Application No. 201080023758.7 with English translation.
Korean Decision for Grant of Patent issued Sep. 12, 2013 in corresponding Korean Patent Application No. 2011-7028699 with partial English translation.

* cited by examiner

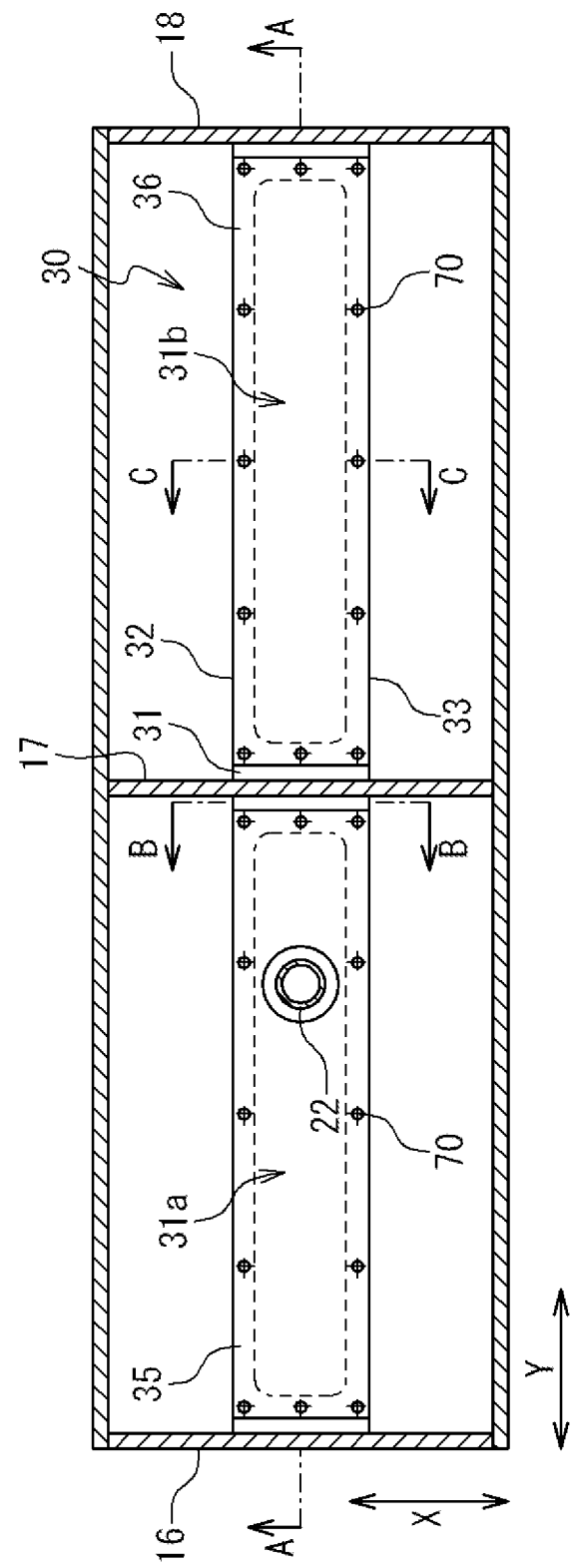

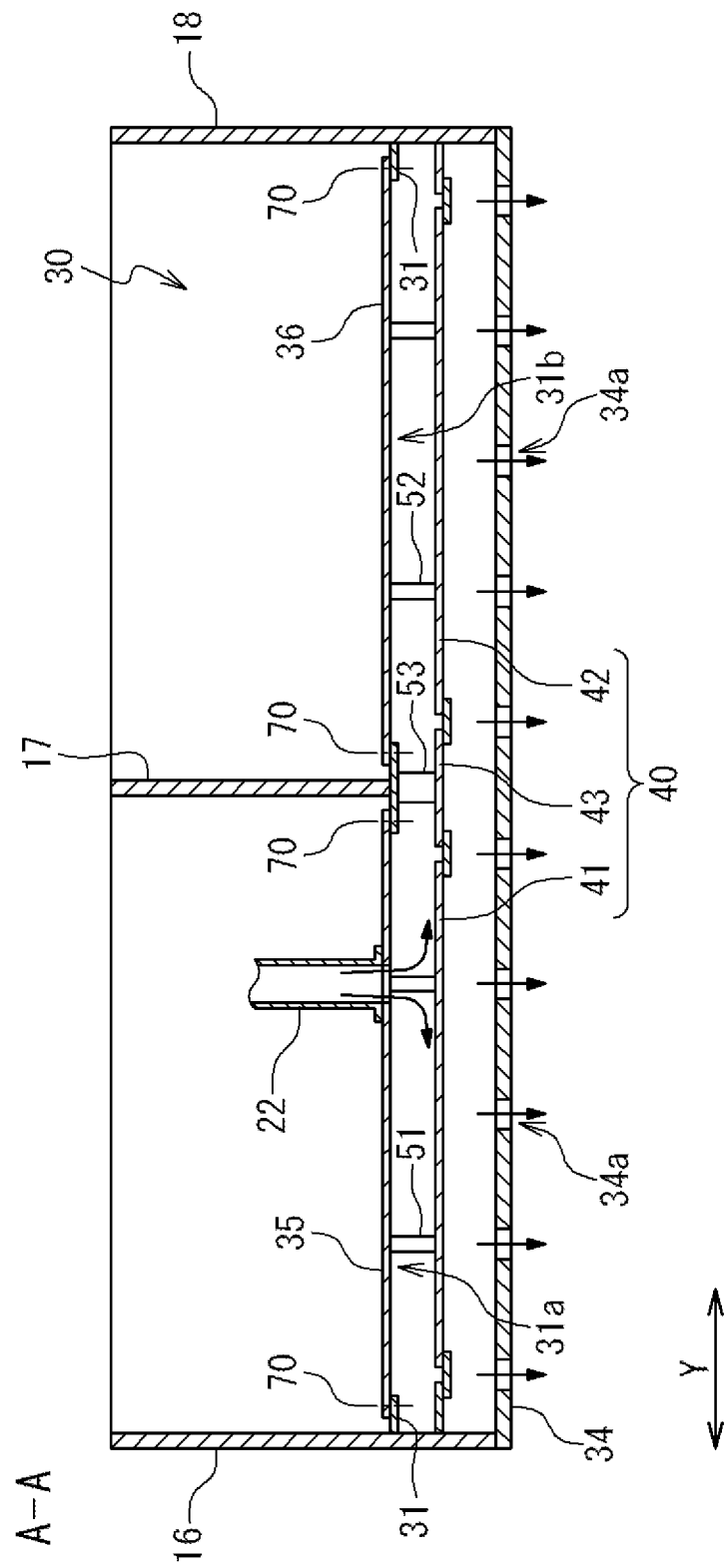

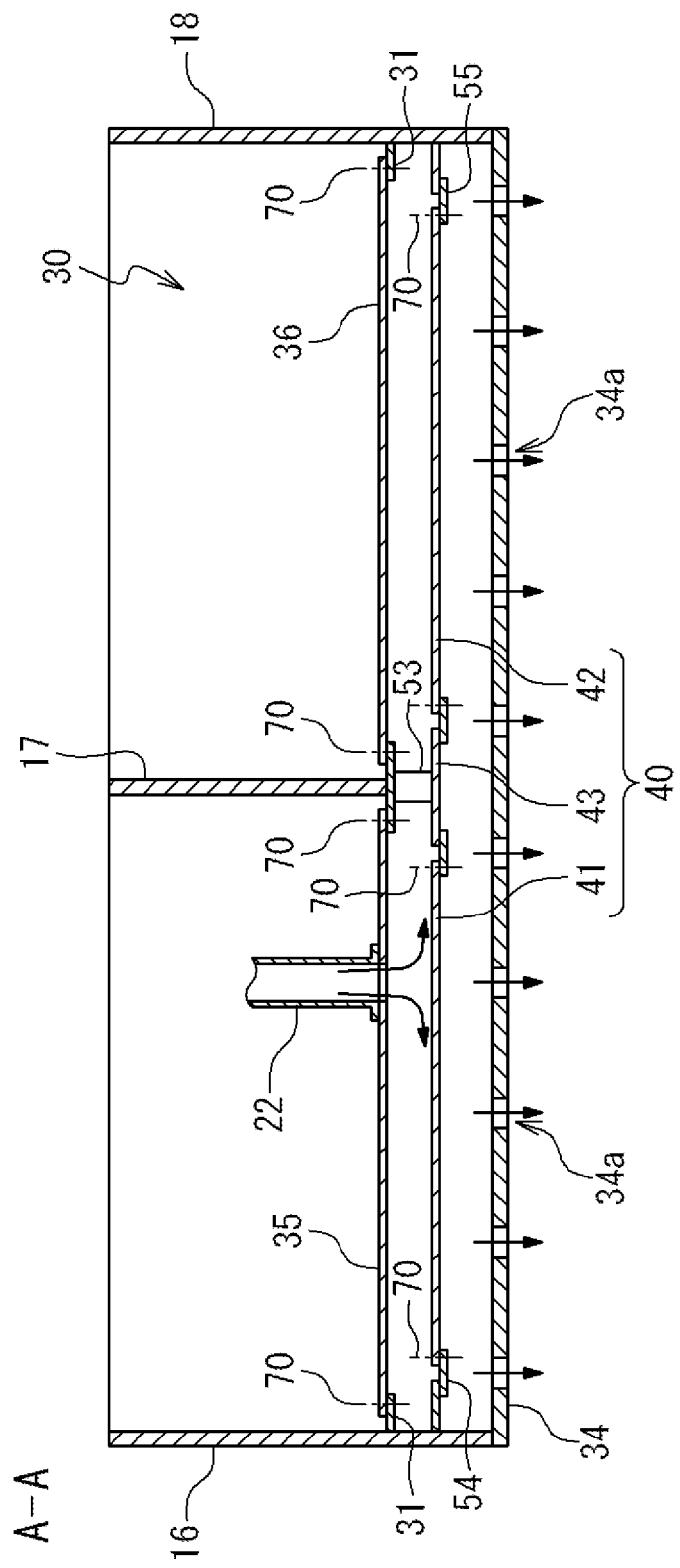

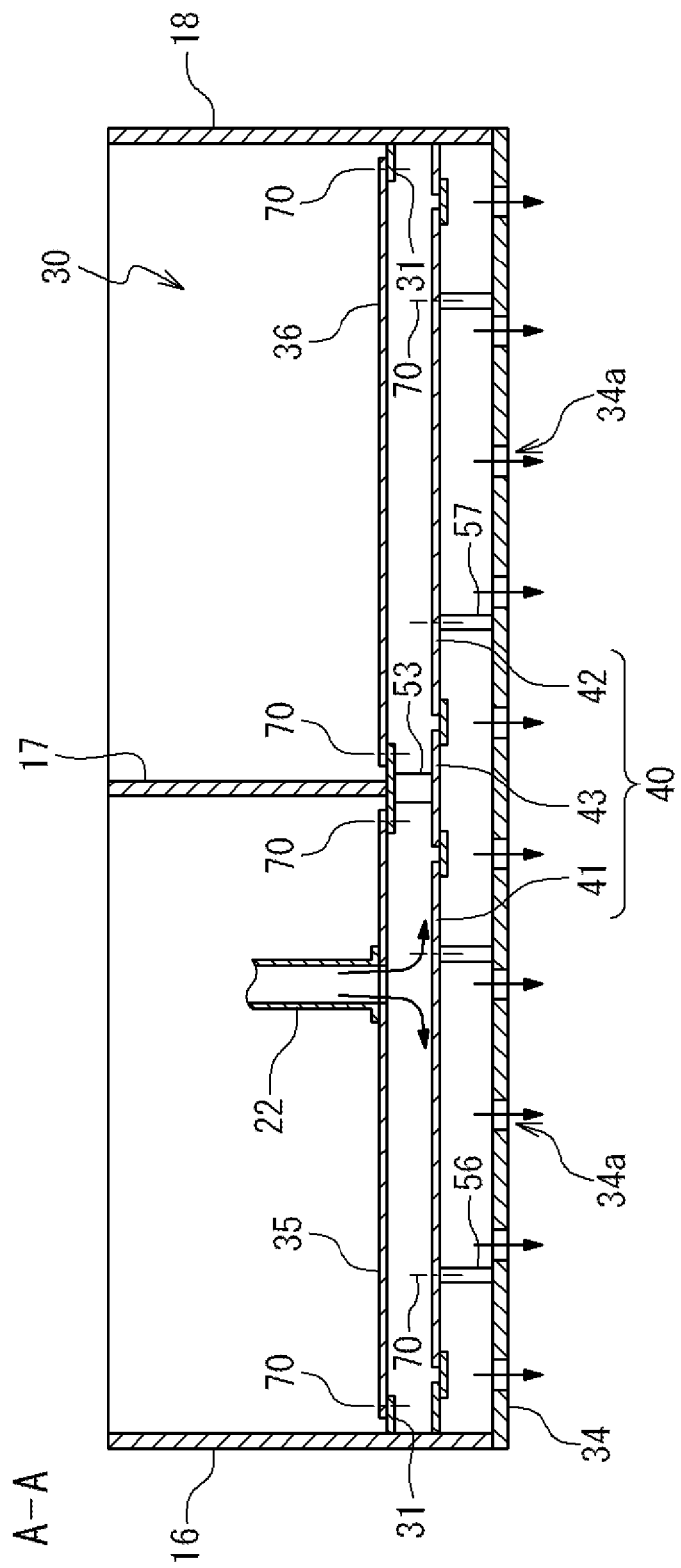

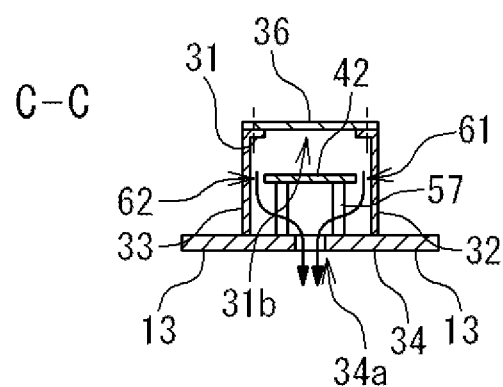

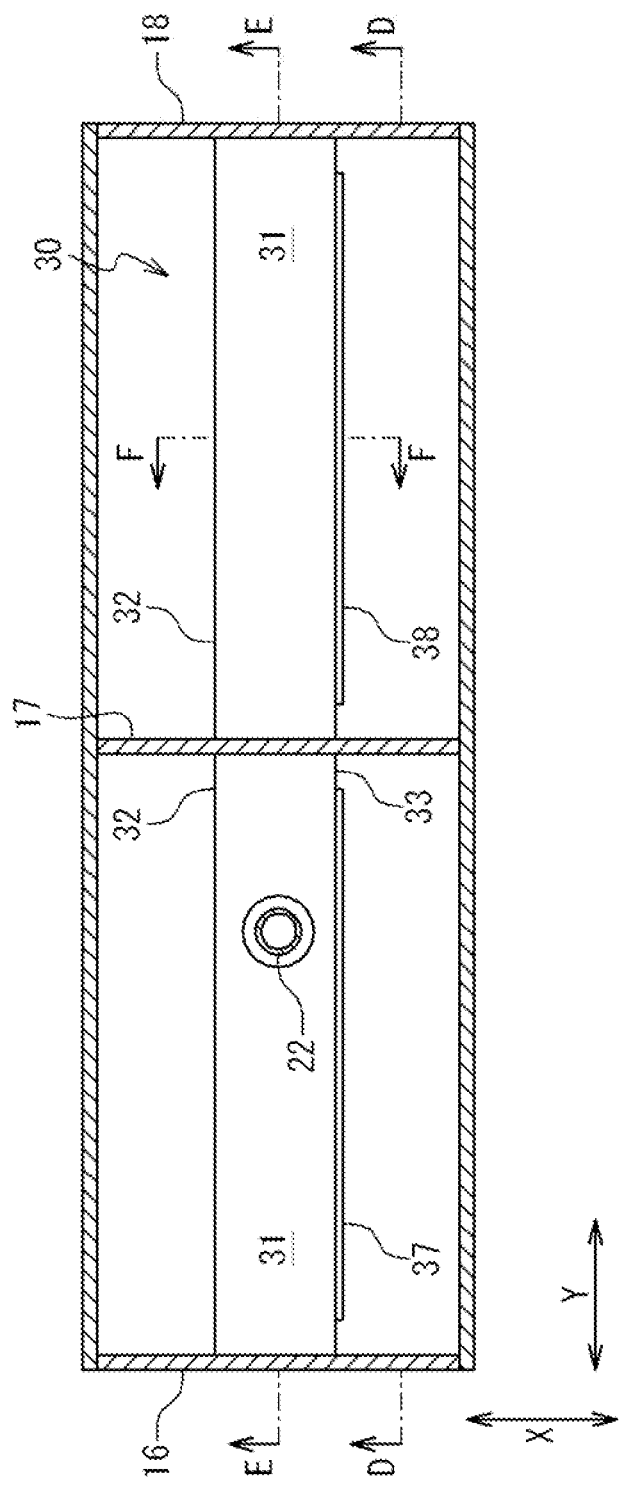

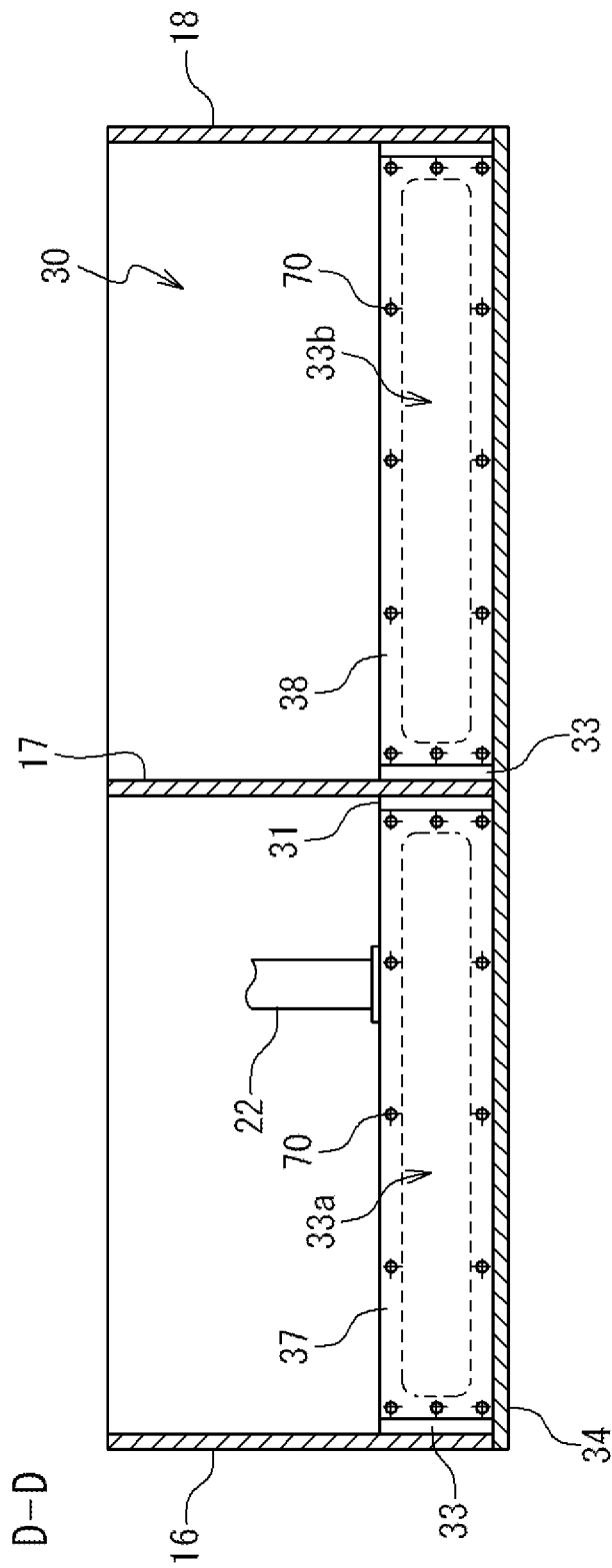

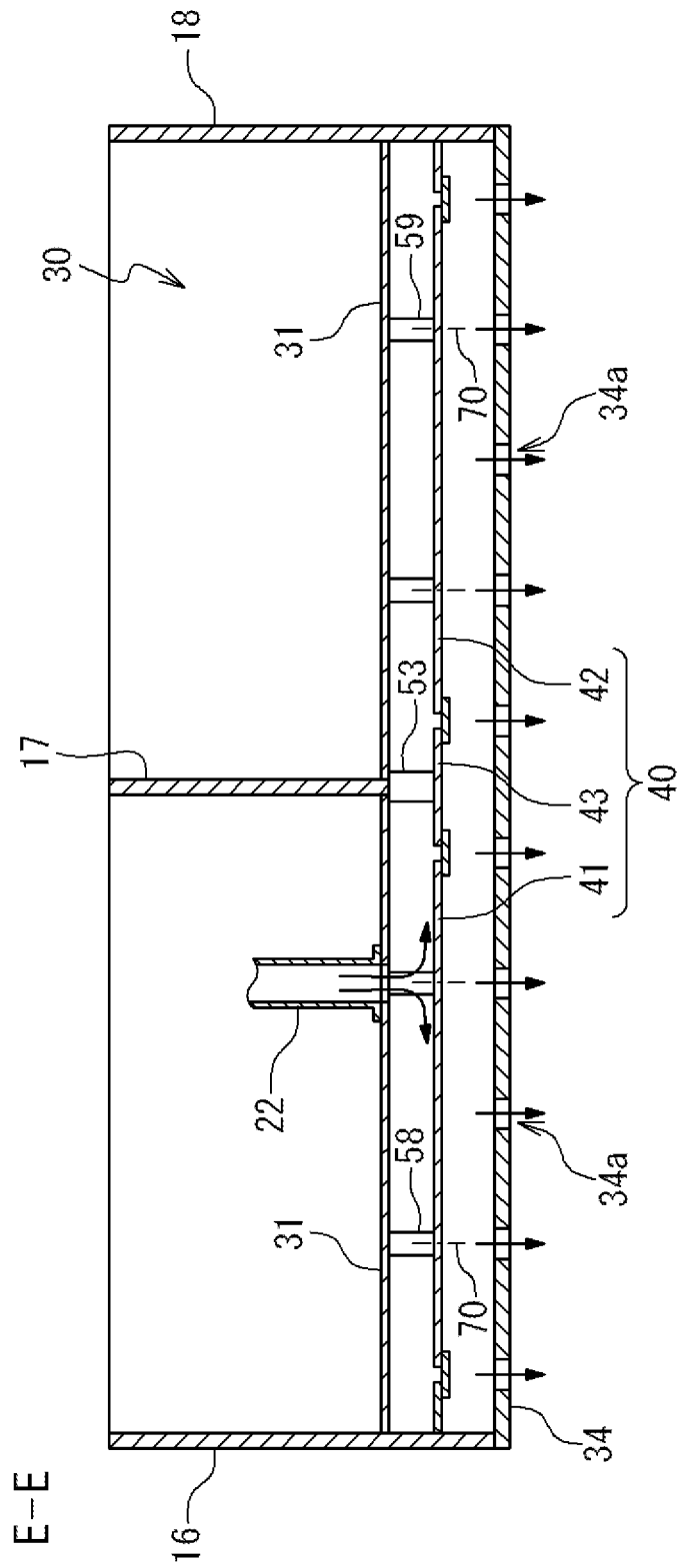

FRICTIONAL RESISTANCE REDUCING DEVICE OF SHIP

TECHNICAL FIELD

The present invention is related to a frictional resistance reducing device which reduces frictional resistance of a hull through air blowing.

BACKGROUND ART

A technique is known which reduces frictional resistance of a hull by covering the bottom surface of a ship with an air bubble flow at the time of navigation.

Referring to FIG. 1, a hull frictional resistance reducing device described in JP 2008-143345A will be described. A gas room 2 is provided on the bow side in a bottom section 1 of a ship. The gas room 2 is formed in the width direction. The gas room 2 is divided into three gas rooms 2a in the width direction of the ship bottom section 1 by partitions 2b. Parts of the outer plate of the ship bottom corresponding to the gas rooms 2a are cut to form bottom openings 1a with no bottom plate. Each gas room 2a is connected with a compressor 4 through the gas supply pipe 3. In each gas room 2a, a baffle plate 6 is provided apart below from a connection opening of the gas supply pipe 3 in the top wall to receive a gaseous flow. A pair of gas holding boards 5 is provided from a bow section toward a stern section along the both sides of the ship bottom.

Because the baffle plate 6 receives a gas blown from the gas supply pipe 3 into the gas room 2a, the gas filling the gas room 2a is blown in an almost uniform condition from the bottom opening 1a into the water. In this way, it is possible to generate the air bubble flow which efficiently flows to the backward side along the ship bottom surface. Moreover, the outward flow of the air bubble flow into the hull sides is prevented by the gas holding boards 5. In this way, the hull frictional resistance is reduced.

CITATION LIST

[Patent Literature 1]: JP 2008-143345A

SUMMARY OF THE INVENTION

The subject matter of the present invention is to provide a frictional resistance reducing device for a ship, for which it is not necessary to provide many air supply pipes in a hull.

In the first viewpoint of the present invention, the ship frictional resistance reducing device is provided with a gas room provided in a hull to cross a longitudinal frame and to extend into the width direction, a scattering member arranged in the gas room to cross the longitudinal frame and to extend into the width direction, and an air supply pipe connected with the gas room. Air blown into the gas room from the air supply pipe hits the scattering member and is scattered into the width direction. Then, the air is blown into water from an air blowing hole.

Desirably, a first opening is provided in a portion of the gas room on a port side from the longitudinal frame to connect an inside of the hull and the gas room. A second opening is provided in another portion of the gas room on a starboard side from the longitudinal frame to connect the inside of the hull and the gas room. A first lid is attached to the first opening. A second lid is attached to the second opening. A first part of the scattering member which is a part of the scattering member on the port side from the longitudinal frame and a second part of the scattering member which is a part of the scattering member on the starboard side from the longitudinal frame can be separated from the scattering member. The scattering member first part has such a size that the scattering member first part is possible to pass through the first opening. The scattering member second part is such a size that the scattering member second part is possible to pass through the second opening.

Desirably, the first opening and the second opening are formed in an upper portion of the gas room. The air supply pipe is connected with the first lid or the second lid.

Desirably, the scattering member first part is attached to the first lid, and the scattering member second part is attached to the second lid.

Desirably, the first opening and the second opening are formed in a side portion in a longitudinal direction of the gas room. The side portion in the longitudinal direction is provided on a bow side of or a stern side of the gas room. The air supply pipe is connected with on the upper portion of the gas room.

Desirably, a bow side slit hole is arranged on the bow side of the scattering member to extend into the width direction. The stern side slit hole is arranged on the stern side of the scattering member to extend into the width direction. Air blown into the gas room from the air supply pipe passes through the bow side slit hole or the stern side slit hole and is blown into water from the air blowing hole.

According to the present invention, the frictional resistance reducing device of the ship, for which it is not necessary to provide the many air supply pipes in the hull.

BRIEF DESCRIPTION OF THE DRAWINGS

The above subject matter, other objects, the effect and the features of the present invention become clearer from the description in the following embodiments in conjunction with the attached drawings:

FIG. 5A is a plan view of the gas room provided for the frictional resistance reducing device according to the first embodiment;

FIG. 5B is a side sectional view of the gas room provided for the frictional resistance reducing device according to the first embodiment along the line A-A of FIG. 5A;

FIG. 6A is a side sectional view of a first modification of the gas room according to the first embodiment along the line A-A of FIG. 5A;

FIG. 7A is a side sectional view of a second modification of the gas room according to first embodiment along the line A-A of FIG. 5A;

FIG. 7B is a sectional view of the second modification of the gas room according to first embodiment along the line C-C of FIG. 5A;

FIG. 8A is a plan view of the gas room provided for the frictional resistance reducing device according to a second embodiment of the present invention;

FIG. 8B is a sectional view of the gas room provided for the frictional resistance reducing device according to the second embodiment of the present invention along the line D-D of FIG. 8A;

FIG. 8C is a sectional view of the gas room provided for the frictional resistance reducing device according to the second embodiment of the present invention along the line E-E of FIG. 8A.

DESCRIPTION OF EMBODIMENTS

Hereinafter, a ship provided with a frictional resistance reducing device according to the present invention will be described in detail with reference to the attached drawings.

First Embodiment

Figure 1:
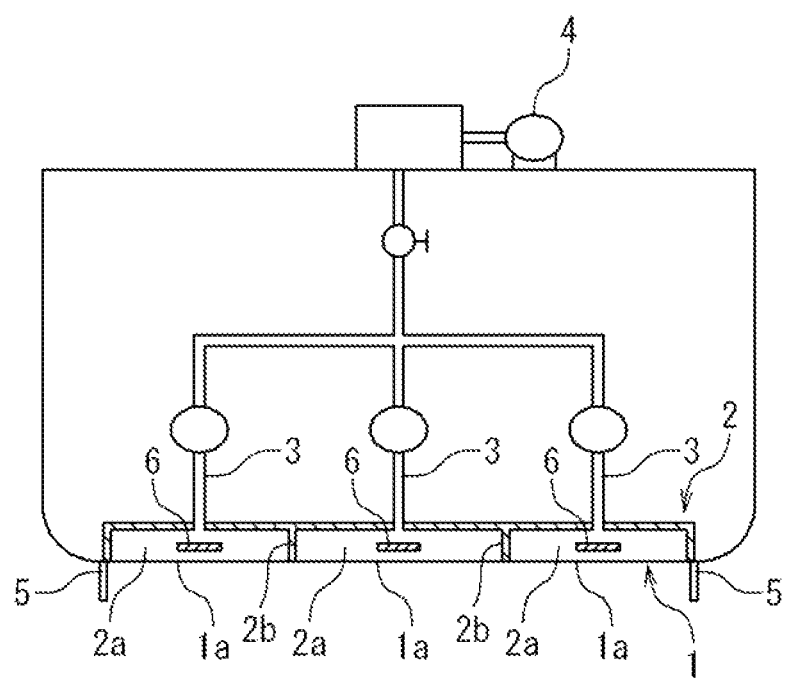
FIG. 1 is a sectional view of a ship provided with a conventional hull frictional resistance reducing device.
Figure 2:
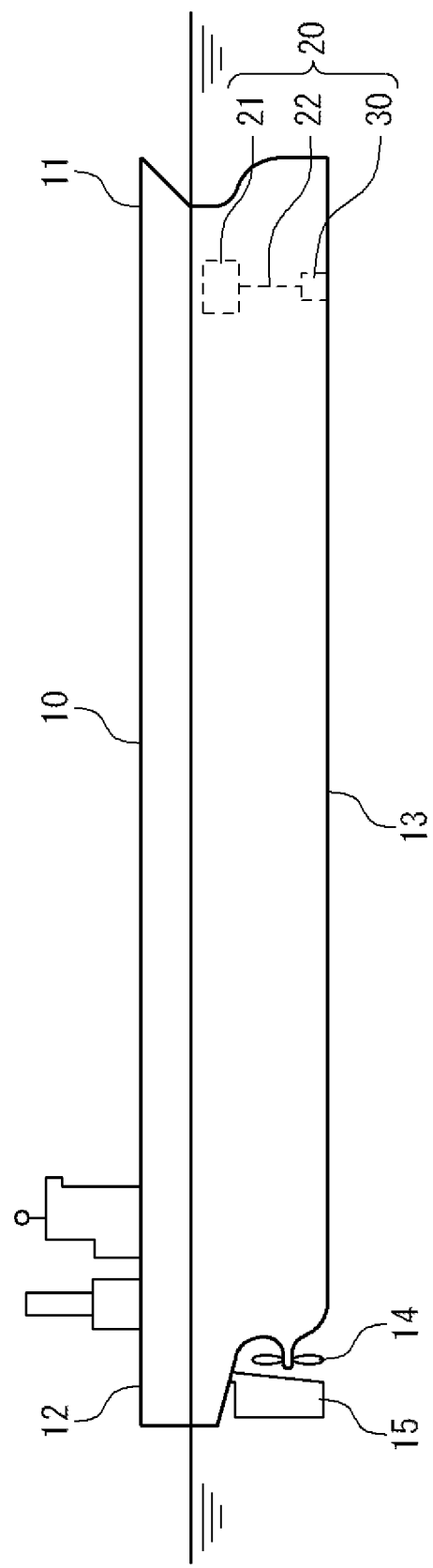
FIG. 2 is a side view of a ship provided with a frictional resistance reducing device according to a first embodiment of the present invention.

Referring to FIG. 2, a ship according to a first embodiment of the present invention is provided with a hull 10 and a frictional resistance reducing device 20. The hull 10 is provided with a bow 11, a stern 12, and a bottom in a ship 13. The propeller 14 and a rudder 15 are provided for the stern 12. The frictional resistance reducing device 20 is provided with an air feeder 21, an air supply pipe 22 and a gas room 30. The air feeder 21 is a compressor or a blower. The air feeder 21 and the gas room 30 are connected through the air supply pipe 22. The gas room 30 is provided on the side of bow 11 of the bottom of the ship 13.

Figure 3:
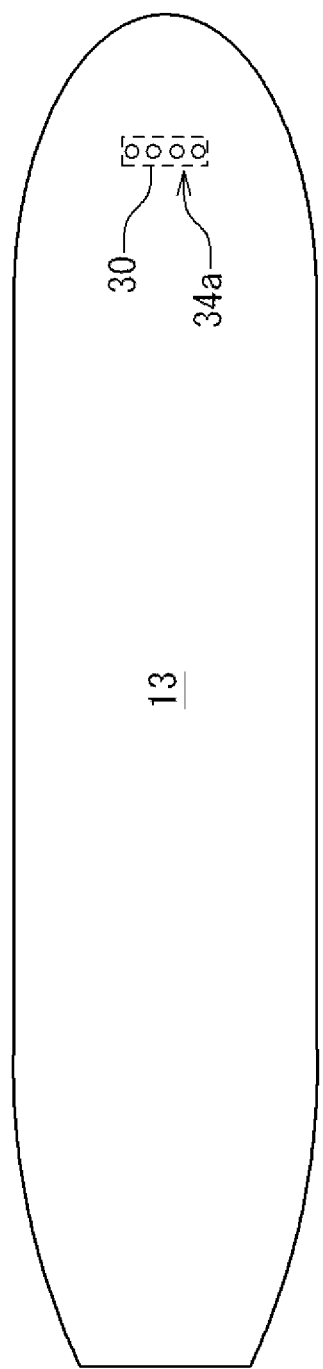
FIG. 3 is a bottom view of the ship provided with the frictional resistance reducing device according to the first embodiment.

Referring to FIG. 3, a plurality of air blowing holes 34a are formed in the gas room 30 to be opened in the bottom of the ship 13. The frictional resistance reducing device 20 blows air from the air blowing holes 34a into water when the ship 13 navigate. Thus, an air bubble flow is formed along the bottom of the ship 13 to reduce the frictional resistance of the hull 10.

Figure 4:
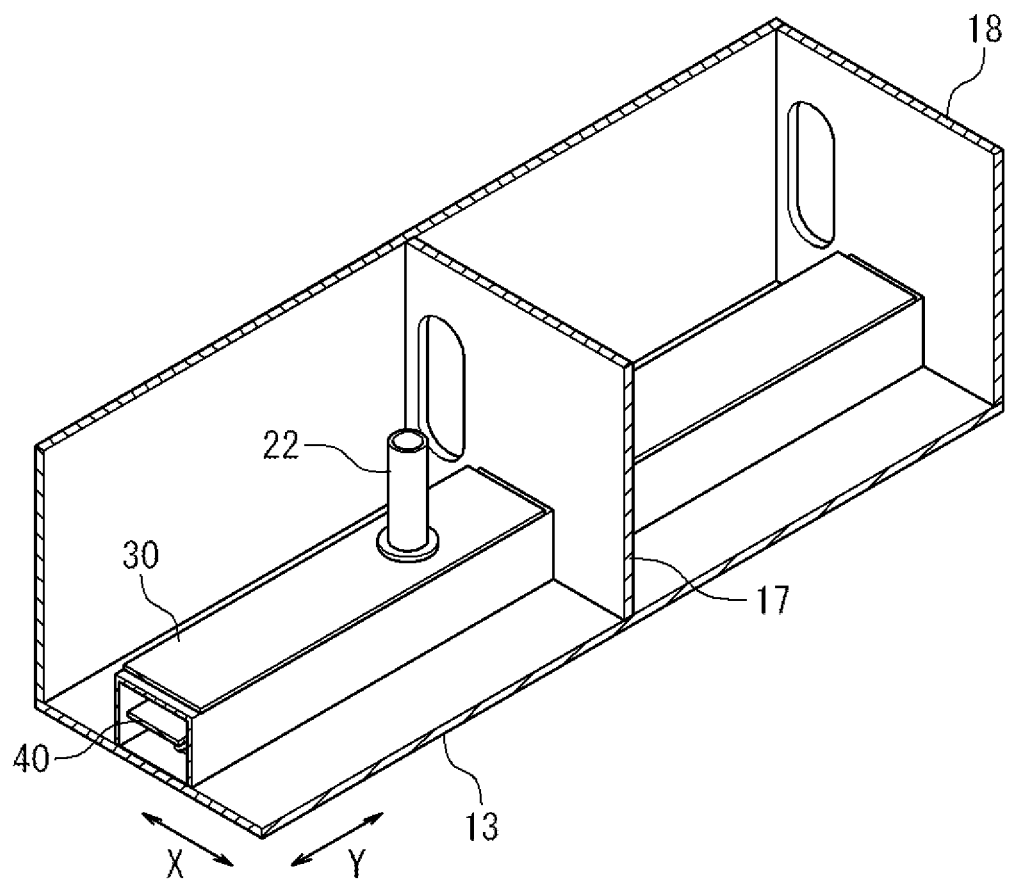
FIG. 4 is a perspective view of a gas room provided for the frictional resistance reducing device according to the first embodiment.

Referring to FIG. 4, the hull 10 is provided with longitudinal frames 17 and 18. The longitudinal frames 17 and 18 and the longitudinal frame 16 to be described later are partitions which divide a space of the hull 10 into a width direction Y of the hull 10 (a direction from the port side to the starboard side). The gas room 30 is provided in the hull 10 to cross the longitudinal frame 17 (to pass through the longitudinal frame 17) and to extend to the width direction Y. The frictional resistance reducing device 20 is provided with a scattering member 40 which is arranged in the gas room 30. The scattering member 40 crosses the longitudinal frame 17 and extends the width direction Y. Therefore, the longitudinal directions of the gas room 30 and the scattering member 40 are parallel to the width direction Y. It should be noted that X in FIG. 4 shows a longitudinal direction (a direction from the bow to the stern) of the hull 10. The air supply pipe 22 is connected with the gas room 30 from an upper side. A part of the air supply pipe 22 which is connected with the gas room 30 extends into the upper and lower directions.

Referring to FIG. 5A, the gas room 30 will be described. The hull 10 is further provided with the longitudinal frame 16. The longitudinal frame 16 is arranged on the port side of the longitudinal frame 17. The longitudinal frame 18 is arranged on the starboard side of the longitudinal frame 17. The gas room 30 is provided with an upper member 31, a longitudinal side member 32 on the side of bow 11, a longitudinal side member 33 on the side of stern 12, and lids 35 and 36. An opening 31a is formed in a part of the upper member 31 on the port side from the longitudinal frame 17. An opening 31b is formed in a part of the upper member 31 on the starboard side from the longitudinal frame 17. The openings 31a and 31b connect the internal space of the gas room 30 and the internal space of the hull 10. The lid 35 is attached to the opening 31a by bolts 70. The lid 36 is attached to the opening 31b by bolts 70. Therefore, it is possible to remove the lids 35 and 36. The air supply pipe 22 is connected with the lid 35.

Referring to FIG. 5B, the gas room 30 will be described. The gas room 30 is provided with a bottom member 34 in which the plurality of air blowing holes 34a are formed. The bottom member 34 is formed as the bottom of the ship 13. The plurality of air blowing holes 34a are arranged in the width direction Y. The longitudinal frame 16 forms a port side member on the port side of the gas room 30. The longitudinal frame 18 forms a starboard side member on the starboard side of the gas room 30. The scattering member 40 has a block structure which is provided with a first part 41, a second part 42 and a middle part 43. The first part 41 forms a part of the scattering member 40 on the port side from the longitudinal frame 17. The second part 42 forms a part of the scattering member 40 on the starboard side from the longitudinal frame 17. The middle part 43 forms a part of the scattering member 40 between the first part 41 and second part 42. The first part 41 has a size enough to pass through the opening 31a. The first part 41 is attached to the lid 35 through supporting members 51. The second part 42 has a size enough to pass through the opening 31b. The second part 42 is attached to the lid 36 through supporting members 52. The middle part 43 is supported by the longitudinal frame 17 through a supporting member 53. The first part 41 and the second part 42 can be separated from the scattering member 40. A connection port of the air supply pipe 22 and the lid 35 is arranged straightly above the scattering member 40 (the first part 41). The plurality of air blowing holes 34a are arranged straightly below the scattering member 40.

Figure 5C:
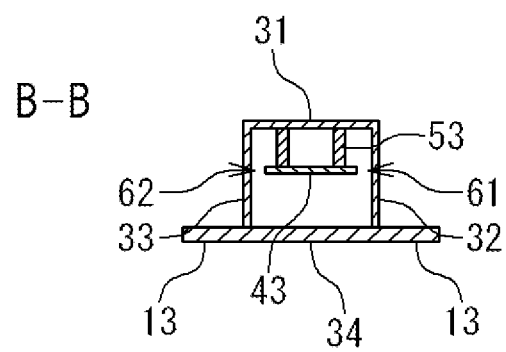
FIG. 5C is a sectional view of the gas room provided for the frictional resistance reducing device according to the first embodiment along the line B-B of FIG. 5A.
Figure 5D:
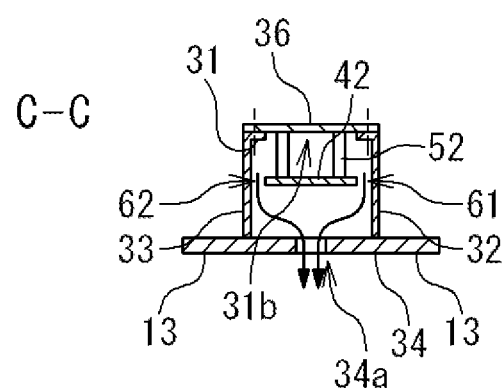
FIG. 5D is a sectional view of the gas room provided for the frictional resistance reducing device according to the first embodiment along the line C-C of FIG. 5A.

Referring to FIGS. 5C and 5D, a slit hole 61 is formed between the scattering member 40 and the longitudinal side member 32 to extend in the width direction Y. A slit hole 62 is formed between the scattering member 40 and the longitudinal side member 33 to extend in the width direction Y. The slit hole 61 is arranged on the side of bow 11 of the scattering member 40. The slit hole 62 is arranged on the side of the stern 12 of the scattering member 40.

The air feeder 21 supplies air into the gas room 30 through the air supply pipe 22. The air is blown from the air supply pipe 22 into the gas room 30 as a flow in a downward direction for the scattering member 40 (the first part 41). The air blown into the gas room 30 from the air supply pipe 22 hits the scattering member 40 and scatters into the width direction Y, and moreover after passing the slit hole 61 or the slit hole 62, is blown from the air blowing holes 34a into water. Therefore, an air bubble flow, which is uniform in the width direction Y, is formed along the bottom of the ship 13.

In the frictional resistance reducing device 20 according to the present embodiment, the air bubble flow which is wide in the width direction Y can be formed by the single gas room 30 because the gas room 30 crosses the longitudinal frame 17 to extend in the width direction Y. Therefore, the number of gas rooms 30 which are necessary to form the air bubble flow which covers the whole width of the bottom of the ship 13 in the width direction Y may be few, and the number of air supply pipes 22 which are provided every gas room 30 may be few. According to the present embodiment, it is not necessary to provide the many air supply pipes in the hull 10 where the space is limited.

Moreover, in the frictional resistance reducing device 20 according to the present embodiment, the opening 31a or 31b is provided between adjacent two of the longitudinal frames 16 to 18. It is possible to separate the first part 41 and the second part 42 from the scattering member 40 and to take them out of the gas room 30 (in the hull 10) through the openings 31a and 31b. Therefore, the cleaning to remove marine organisms such as barnacles which are adhered to the gas room 30 and the scattering member 40 is easy at the time of the docking. Therefore, the frictional resistance reducing device 20 according to the present embodiment is superior for maintenance.

Moreover, because the lid 35 and the first part 41 are coupled by the supporting member 51, and the lid 36 and the second part 42 are coupled by the supporting member 52, the first part 41 is taken out from the gas room 30 at the same time as removing the lid 35, and the second part 42 is taken out from the gas room 30 at the same time as removing the lid 36. Therefore, works for the maintenance can be little.

[First Modification]

Figure 6B:
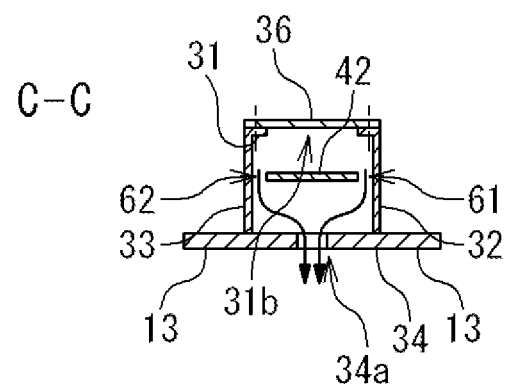
FIG. 6B is s sectional view of the first modification of the gas room according to the first embodiment along the line C-C of FIG. 5A.

Next, a first modification of the first embodiment will be described with reference to FIGS. 6A and 6B. The frictional resistance reducing device 20 according to the first modification is same as the frictional resistance reducing device 20 according to the first embodiment, excluding the following description.

In the gas room 30 according to the first modification, the first part 41 of the scattering member 40 is not attached to the lid 35 and the second part 42 of the scattering member 40 is not attached to the lid 36. A supporting member 54 is provided for as the longitudinal frame 16 (longitudinal side member of the gas room 30) on the port side and a supporting member 55 is provided for the longitudinal frame 18 (longitudinal side member of the gas room 30) on the starboard side. The first part 41 is attached to the supporting member 54 and the middle part 43 by bolts 70, and the second part 42 is attached to the supporting member 55 and the middle part 43 by bolts 70. Therefore, the first part 41 and the second part 42 can be detachable.

In the maintenance of the gas room 30 according to the first modification, the first part 41 is taken out of the gas room 30 (in the hull 10) through the openings 31a after removing the lid 35. The second part 42 is taken out of the gas room 30 (in the hull 10) through the opening 31b after removing the lid 36.

[Second Modification]

Next, referring to FIGS. 7A and 7B, a second modification of the first embodiment will be described. The frictional resistance reducing device 20 according to the second modification is same as the above frictional resistance reducing device 20 according to the first embodiment, excluding the following explanation.

In the gas room 30 according to the second modification, the first part 41 of the scattering member 40 is not attached to the lid 35 and the second part 42 of the scattering member 40 is not attached to the lid 36. Supporting members 56 are provided for a part of the bottom 34 on the port side from the longitudinal frame 17 and supporting members 57 are provided for a part of the bottom 34 on the starboard side from the longitudinal frame 17. The first part 41 is attached to the supporting members 56 by bolts 70 and the second part 42 is attached to the supporting members 57 by bolts 70. Therefore, the first part 41 and the second part 42 are detachable.

In the maintenance of the gas room 30 according to the second modification, the first part 41 is taken out of the gas room 30 (in the hull 10) through the openings 31a after removing the lid 35. The second part 42 is taken out of the gas room 30 (in the hull 10) through the opening 31b after removing the lid 36.

It should be noted that the air supply pipe 22 may be connected with the lid 36 in the first embodiment, and the first modification and the second modification of the present embodiment.

Second Embodiment

Referring to FIGS. 8A to 8D, the frictional resistance reducing device 20 according to the second embodiment of the present invention will be described. The frictional resistance reducing device 20 according to the present embodiment is same as the frictional resistance reducing device 20 according to the first embodiment, excluding the following description.

Referring to FIG. 8A, the gas room 30 according to the present embodiment will be described. The gas room 30 is provided with lids 37 and 38. An opening is not provided for the upper member 31 of the gas room 30 and any lid attached to the opening is not provided. The air supply pipe 22 is connected with a part of the upper member 31 on the port side from the longitudinal frame 17.

Referring to FIG. 8B, the gas room 30 according to the present embodiment will be described. An opening 33a is formed in a part of the longitudinal side member 33 on the port side from the longitudinal frame 17. An opening 33b is formed in a part of the longitudinal side member 33 on the starboard side from the longitudinal frame 17. The openings 33a and 33b connect the internal space of the gas room 30 and the internal space of the hull 10, respectively. The lid 37 is attached to the opening 33a by bolts 70. The lid 38 is attached to the opening 33b by bolts 70. Therefore, the lids 37 and 38 are detachable.

Referring to FIG. 8C, the first part 41 of the scattering member 40 has a size enough to pass through the opening 33a and the second part 42 of the scattering member 40 has a size enough to pass though the opening 33b. Supporting members 58 are provided for a part of the upper member 31 on the port side from the longitudinal frame 17 and supporting members 59 are provided for a part of the upper member 31 on the starboard side from the longitudinal frame 17. The first part 41 is attached to the supporting member 58 by bolts 70 and the second part 42 is attached to the supporting member 59 by bolts 70. Therefore, the first part 41 and the second part 42 are detachable.

Figure 8D:
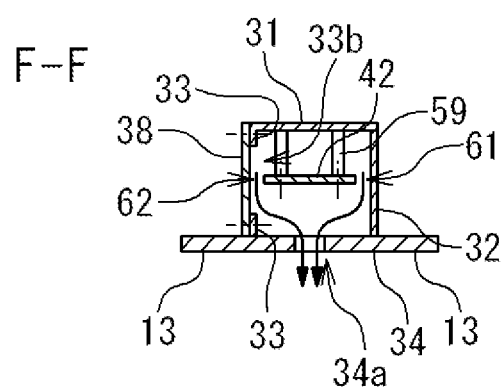
FIG. 8D is a sectional view of the gas room provided for the frictional resistance reducing device according to the second embodiment of the present invention along the line F-F of FIG. 8A.

FIG. 8D shows an attachment structure of the second part 42 to the upper member 31. The first part 41 is attached to the upper member 31, like the second part 42.

In the frictional resistance reducing device 20 according to the present embodiment, because the gas room 30 crosses the longitudinal frame 17 and extends to the width direction Y, the air bubble flow wide in the width direction Y can be formed by the single gas room 30. Therefore, the number of gas rooms 30 which are necessary to form the air bubble flow which covers the whole width of the bottom of the ship 13 in the width direction Y may be few. The number of air supply pipes 22 which are provided for every gas room 30 may be few.

According to the present embodiment, it is not necessary to arrange many air supply pipes in the hull 10 with a limited space.

Moreover, in the frictional resistance reducing device 20 according to the present embodiment, the opening 33a or 33b of the gas room 30 is provided between adjacent two of the longitudinal frames 16 to 18. It is possible to separate the first part 41 and the second part 42 from the scattering member 40 and to take them out of the gas room 30 (in the hull 10) through the openings 33a and 33b. Therefore, the cleaning is easy to remove the marine organisms such as barnacle adhered to the gas room 30 and the scattering member 40 at the time of the docking. Therefore, the frictional resistance reducing device 20 according to the present embodiment is superior in the maintenance.

Moreover, because the air supply pipe 22 is connected with a portion of the gas room 30 other than the lids 37 and 38, the removal of the lids 37 and 38 is easy.

In the present embodiment, like the first modification of the first embodiment, the first part 41 may be supported by the longitudinal side member 16 and the middle part 43 in the gas room 30. The second part 42 may be supported by the longitudinal side member 18 and the middle part 43 in the gas room 30. Also, in the present embodiment, like the second modification of the first embodiment, the first part 41 and the second part 42 may be supported to the bottom 34.

In the present embodiment, the air supply pipe 22 may be connected with a portion of the upper member 31 on the starboard side from the longitudinal frame 17.

In the present embodiment, two openings may be provided for the longitudinal side member 32, instead of that the openings 33a and 33b are provided for the longitudinal side member 33.

In the first and second embodiments, slit holes may be provided for the bottom 34 to extend into the width direction Y, instead of the plurality of air blowing holes 34a.

In the first and second embodiments, the gas room 30 may cross a plurality of longitudinal frames to extend into the width direction Y.

As described above, the embodiments of the present invention have been described. However, the present invention is not limited to the embodiments. Various modifications to the above embodiments can be carried out. Also, the above embodiments may be combined with each other.

This application claims a priority on convention based on Japanese Patent Application No 2009-245515 filed on Oct. 26, 2009. The disclosure thereof is incorporated herein by reference.

The invention claimed is:

1. A frictional resistance reducing device of a ship, the frictional resistance reducing device comprising:
    a gas room provided in a hull to cross a longitudinal frame and to extend in a width direction of the hull;
    a scattering member arranged in said gas room to cross the longitudinal frame and to extend in the width direction; and
    an air supply pipe connected with said gas room,
    wherein air blows into said gas room from said air supply pipe, hits said scattering member and scatters in the width direction, and then blows from an air blowing hole provided in a bottom of said gas room into water,
    wherein a first opening is provided in a portion of said gas room on a port side from the longitudinal frame to connect an internal space of the hull and an internal space of said gas room,
    wherein a second opening is provided in another portion of said gas room on a starboard side from the longitudinal frame to connect the internal space of the hull and the internal space of said gas room,
    wherein a first lid is provided for said first opening, and a second lid is provided for said second opening,
    wherein a first part of said scattering member which is a part of said scattering member on the port side from the longitudinal frame, and a second part of said scattering member which is a part of said scattering member on the starboard side from the longitudinal frame are separable from said scattering member, and
    wherein said first part of said scattering member has such a size that said first part of said scattering member is possible to pass through said first opening, and said second part of said scattering member is such a size that said second part of said scattering member is possible to pass through said second opening.

2. The frictional resistance reducing device according to claim 1, wherein said first opening and said second opening are formed in an upper member of said gas room, and said air supply pipe is connected with said first lid or said second lid.

3. The frictional resistance reducing device according to claim 1, wherein said first part of said scattering member is attached to said first lid, and said second part of said scattering member is attached to said second lid.

4. The frictional resistance reducing device of according to claim 1,
    wherein said first opening and said second opening are formed in a longitudinal side member in a longitudinal direction of said gas room,
    wherein said longitudinal side member is a side member of said gas room on a bow side or a stern side of said gas room, and
    wherein said air supply pipe is connected with an upper member of said gas room.

5. The frictional resistance reducing device according to claim 1,
    wherein a bow side slit hole is formed on a bow side of said scattering member to extend in the width direction,
    wherein a stern side slit hole is formed on a stern side of said scattering member to extend in the width direction, and
    wherein the air blows into said gas room from said air supply pipe, passes through the bow side slit hole or the stern side slit hole, and blows from said air blowing hole into the water.

6. A ship comprising a frictional resistance reducing device of a ship, the frictional resistance reducing device comprising:
    a gas room provided in a hull to cross a longitudinal frame and to extend in a width direction of said hull;
    a scattering member arranged in said gas room to cross said longitudinal frame and to extend in the width direction; and
    an air supply pipe connected with said gas room,
    wherein air blows into said gas room from said air supply pipe, hits said scattering member and scatters in the width direction, and then blows from an air blowing hole provided in a bottom of said gas room into water,
    wherein a first opening is provided in a portion of said gas room on a port side from said longitudinal frame to connect an internal space of said hull and an internal space of said gas room,
    wherein a second opening is provided in another portion of said gas room on a starboard side from said longitudinal frame to connect the internal space of said hull and the internal space of said gas room, wherein a first lid is provided for said first opening, and a second lid is provided for said second opening, wherein a first part of said scattering member which is a part of said scattering member on the port side from said longitudinal frame, and a second part of said scattering member which is a part of said scattering member on the starboard side from said longitudinal frame are separable from said scattering member, and wherein said first part of said scattering member has such a size that said first part of said scattering member is possible to pass through said first opening, and said second part of said scattering member is such a size that said second part of said scattering member is possible to pass through said second opening.

* * * * *